(12) United States Patent  
Thiel

(10) Patent No.: US 7,204,555 B2  
(45) Date of Patent: Apr. 17, 2007

(54) DETENT FITTING FOR A VEHICLE SEAT

(75) Inventor: Peter Thiel, Remscheid (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/411,719

(22) Filed: Apr. 26, 2006

(65) Prior Publication Data

US 2006/0185466 A1    Aug. 24, 2006

Related U.S. Application Data

(63) Continuation of application No. PCT/EP2004/012821, filed on Nov. 12, 2004.

(30) Foreign Application Priority Data

Nov. 28, 2003 (DE) ................ 103 55 820

(51) Int. Cl.  
*B60N 2/02* (2006.01)

(52) U.S. Cl. ............... 297/367; 297/369; 297/364

(58) Field of Classification Search ............. 297/367, 297/364, 369; 267/273, 275, 155  
See application file for complete search history.

(56) References Cited

U.S. PATENT DOCUMENTS

| | | | |
|---|---|---|---|
| 4,082,352 A * | 4/1978 | Bales et al. | 297/364 |
| 4,143,905 A * | 3/1979 | Hensel et al. | 296/65.17 |
| 6,312,053 B1 * | 11/2001 | Magyar | 297/367 |
| 6,454,354 B1 | 9/2002 | Vossmann et al. | |
| 6,474,740 B1 | 11/2002 | Kondo et al. | |
| 6,626,495 B2 * | 9/2003 | Okazaki et al. | 297/367 |
| 2002/0121258 A1 * | 9/2002 | Nieda et al. | 123/185.14 |
| 2003/0155800 A1 | 8/2003 | Asano | |
| 2003/0173810 A1 * | 9/2003 | Lee et al. | 297/367 |
| 2004/0036337 A1 * | 2/2004 | Hoshihara et al. | 297/367 |
| 2004/0075325 A1 | 4/2004 | Assmann et al. | |
| 2004/0195890 A1 * | 10/2004 | Liu et al. | 297/367 |

FOREIGN PATENT DOCUMENTS

| | | |
|---|---|---|
| EP | 0 967 110 A2 | 12/1999 |
| EP | 1 074 426 A2 | 2/2001 |
| EP | 1 195 115 A1 | 4/2002 |
| FR | 2 801 850 | 6/2001 |
| WO | WO 00/06414 A1 | 2/2000 |
| WO | WO 00/44582 | 8/2000 |
| WO | WO 03/022622 A1 | 3/2003 |

* cited by examiner

*Primary Examiner*—David R. Dunn  
*Assistant Examiner*—Sarah B. McPartlin  
(74) *Attorney, Agent, or Firm*—Womble Carlyle Sandridge & Rice, PLLC

(57) ABSTRACT

In the case of a detent fitting (1) for a vehicle seat, in particular for a motor vehicle seat, with a first fitting part (2), a second fitting part (3) which is movable relative to the first fitting part (2), at least one locking element (13) which interacts with the first fitting part (2) and is guided by the second fitting part (3), an eccentric (11) which acts on the locking element (13) and can be rotated about an axis (A), and at least one spiral-shaped spring (17) which acts upon the eccentric (11), the spring (17) encircles the axis (A).

20 Claims, 2 Drawing Sheets

DETENT FITTING FOR A VEHICLE SEAT

CROSS-REFERENCE TO RELATED APPLICATION

The present application is a continuation of International Application PCT/EP2004/012821, which was filed Nov. 12, 2004. The entire disclosure of International Application PCT/EP2004/012821 is incorporated herein by reference.

BACKGROUND OF THE INVENTION

The present invention relates to a detent fitting for a vehicle seat, in particular for a motor vehicle seat, with the detent fitting having a first fitting part, a second fitting part that is movable relative to the first fitting part, at least one locking element that interacts with the first fitting part and is guided by the second fitting part, an eccentric that acts on the locking element and can be rotated about an axis, and at least one spiral-shaped spring which acts upon the eccentric.

WO 00/44582 A1 (which is a member of the same family as U.S. Pat. No. 6,454,354) discloses a detent fitting of the type described immediately above, in which two prestressed spiral springs arranged at the side of the eccentric act upon the eccentric which in turn acts upon two locking elements, namely in the direction radially outward. In their radially outer position, the two locking elements interact with the first fitting part in order to lock the detent fitting. In order to unlock the detent fitting, the eccentric is rotated, by being acted upon externally, counter to the prestressing of the springs. As a result, a control disk sitting on the eccentric pulls the two locking elements, which are provided with protruding lugs, radially inward.

BRIEF SUMMARY OF SOME ASPECTS OF THE INVENTION

An aspect of the present invention is the provision of improvements to a detent fitting of the type mentioned immediately above, in particular a reduction in the number of components. In accordance with this aspect, a detent fitting for a vehicle seat, in particular for a motor vehicle seat, includes a first fitting part, a second fitting part that is movable relative to the first fitting part, at least one locking element that interacts with the first fitting part and is guided by the second fitting part, an eccentric that acts on the locking element and can be rotated about an axis, and at least one spiral-shaped spring that acts upon the eccentric, wherein the spring encircles the axis.

According to the present invention, the spring encircles the axis, i.e. substantially covers the construction space which is defined between the fitting parts and within which the components required for locking the detent fitting are arranged, for example the eccentric, the locking elements and also the spring. As a result, there is firstly the possibility of providing a single spring for the main task of the spring, i.e. the acting upon the eccentric, and the single spring can act upon the eccentric at least approximately symmetrically. This reduces the number of components required. In this case, the spring is preferably supported on the fitting part which guides the locking elements. Secondly, the spring can take on further tasks, for example the spring can pull the locking elements inward, which likewise reduces the number of components required, i.e. reduces the production costs and facilitates the installation.

In a preferred arrangement of the components of the detent fitting according to the invention, the eccentric is arranged radially inward and the locking elements, typically two locking elements, are arranged radially outward. The eccentric which is acted upon by the preferably prestressed spring presses the locking elements radially outward so that they interact with the first fitting part, with the result that the detent fitting is locked. For unlocking, the locking elements are to be pulled radially inward. For this purpose, each locking element has a lug, a cam, a projection or the like which, for example, is pressed out of the material of the locking element. In this case, the spring is arranged with at least one coil or a switching contour radially outside the lug or cam, so that the coil or switching contour can carry along the locking element during a movement radially inward.

When the eccentric is acted upon externally, for example by a shaft or the like acting in the region of the axis, the spring is preferably contracted, for example by the inner part of the spring being fitted on the eccentric and the outer part of the spring being fitted in a manner such that it is secured to the second fitting part. The contracting spring then preferably pulls the locking element radially inward at its lug, cam, projection or the like, for example directly by means of the coil or by means of a switching contour.

The inner end of the spring preferably sits in a form-fitting manner on the eccentric in order to ensure that it is readily carried along. This can be realized by way of projections and/or receptacles at the inner end of the spring. The inner end of the spring can be in the form of an inner ring that is integrally formed with the spring and sits on the eccentric and surrounds the eccentric annularly. Projections and/or receptacles are preferably also provided in the inner ring to form the form-fitting connection.

The spring is preferably punched in a spiral-shaped manner out of a thin spring steel sheet, so that the projections and/or receptacles can be formed at the same time and, by way of a deviation in the geometry from the subsequent installation state, a prestress can be impressed.

A vehicle seat according to the invention has at least one, preferably two of the detent fittings according to the invention which are connected to each other by way of a transmission rod, for example.

Other aspects and advantages of the present invention will become apparent from the following.

BRIEF DESCRIPTION OF THE DRAWINGS

The invention is explained in greater detail below with reference to exemplary embodiments which are illustrated in the drawings, in which.

DETAILED DESCRIPTION OF EXEMPLARY EMBODIMENT

Figure 1:
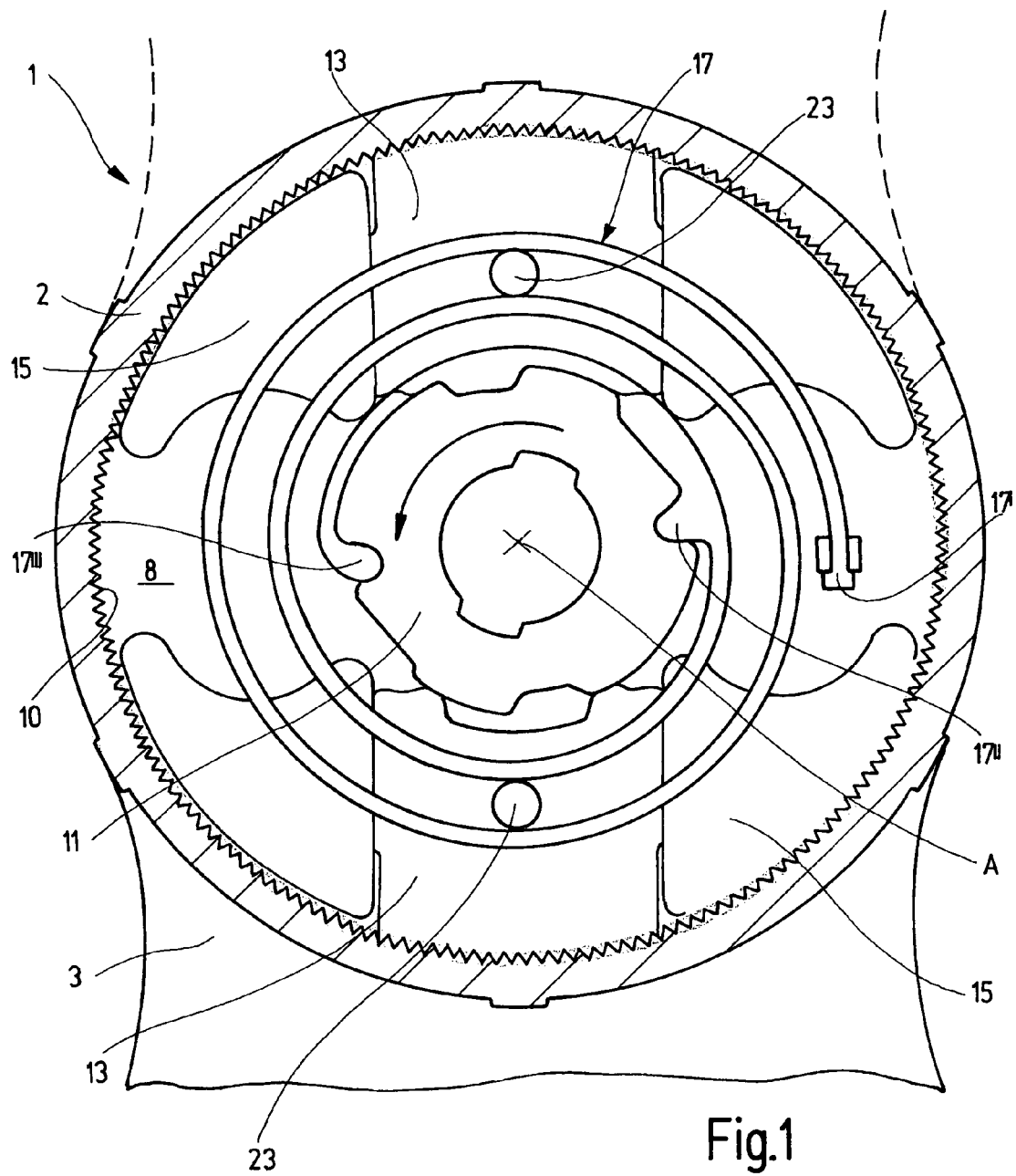
FIG. 1 shows a section through the first exemplary embodiment.
Figure 2:
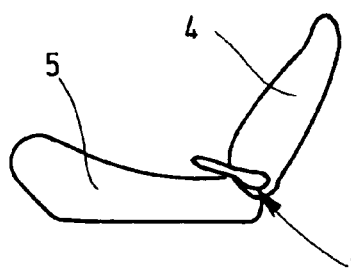
FIG. 2 shows a schematic partial view of a vehicle seat according to the invention.
Figure 3:
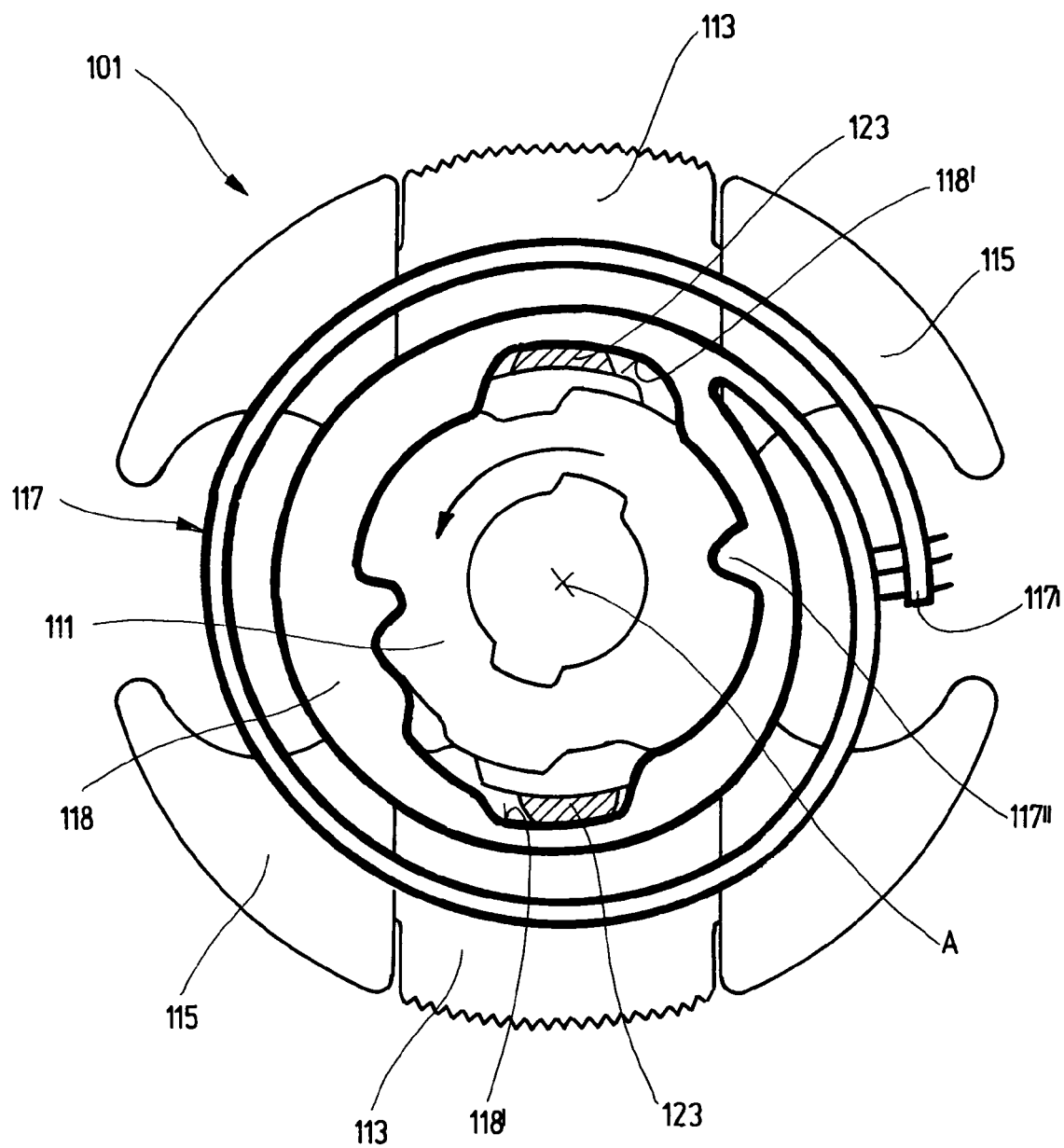
FIG. 3 shows a section through parts of the second exemplary embodiment.

The first exemplary embodiment relates to a detent fitting 1 of a vehicle seat for a motor vehicle. The detent fitting 1 comprises an upper fitting part, referred to as the first fitting part 2 in the Detailed Description section of this disclosure, and a lower fitting part, referred to as the second fitting part 3 in the Detailed Description section of this disclosure. There are two detent fittings 1 that are respectively arranged on opposite sides of the vehicle seat. The backrest 4, which is fastened to the first fitting part 2, is attached to the seat part 5 of the vehicle seat by way of the two detent fittings 1. The two detent fittings 1 are connected to each other by a transmission rod (not specifically illustrated). For these and all details not described specifically below reference is made to WO 00/44582 A1 (which is a member of the same family as U.S. Pat. No. 6,454,354), the entire disclosure of which is expressly incorporated herein by reference.

The inner face of the first fitting part, which faces the second fitting part 3, has a cylindrical depression which defines a construction space 8 between the two fitting parts 2 and 3. The periphery of the construction space 8 that is formed in the first fitting part 2 and runs in the circumferential direction bears a toothed ring 10. An eccentric 11 in the form of a circular disk with two point-symmetrical pairs of two cams in each case on the outer circumference sits within the construction space 8 on a driver (not specifically illustrated). The driver in turn sits on the transmission rod in a rotationally fixed manner, with the result that the eccentric 11 can be rotated about a central axis A.

In the same plane as the eccentric 11, but at a greater radial distance from the axis A, two flat toothed segments, referred to as locking elements 13 in the Detailed Description section of this disclosure, are arranged within the construction space 8 and are movable in the radial direction in a manner offset by 180° (i.e. point-symmetrically with respect to each other). On its edge at its radially outer end, each locking element 13 bears a toothing for interaction with the toothed ring 10. Each locking element 13 is provided at its radially inner end on the edge with a two-cam contour which interacts with the eccentric 11 acting as control element. Those edge surfaces of the locking elements 13 which run in the radial direction are parallel to each other over most of their length.

The second fitting part 3 has a guide 15 that projects into the construction space 8 for guiding the locking elements 13, which are situated in the same plane. The guide 15 comprises four segments which are arranged mirror-symmetrically with respect to one another. Each pair of the segments of the guide 15 form a channel for a respective one of the locking elements 13, with the parallel edge surfaces of the locking element bearing against the side walls of the channel. The guide 15 is used at the same time for the mounting of the first fitting part 2 on the second fitting part 3, i.e. the first fitting part 2 sits with its toothed ring 10 on the cylindrically curved outer side of the four segments.

A spring 17 is punched in a spiral-shaped manner out of a thin spring steel sheet approximately 1 mm thick. The spring 17 is arranged within the construction space 8 in a plane between that, on the one hand, of the locking elements 13 and of the guide 15, and on the other hand, of the end-side periphery of the construction space 8 that is provided on the first fitting part 2. The spring 17 encircles the axis A. The outer spring end 17' of the single spring 17 is clamped, clipped or fastened in some other manner to the second fitting part 3. A plurality of radially inwardly pointing projections 17'', including one which is provided on the inner spring end 17''', sit in a form-fitting manner in receptacles on the circumferential surface of the eccentric 11 and can be additionally secured, so that a rotationally fixed seat of the spring 17 on the eccentric 11 is ensured. Two lugs 23 (e.g., projections) respectively protrude in the axial direction from the locking elements 13. The lugs 23 are arranged between the coils of the spring 17. The spring 17 is preferably installed with prestress in such a manner that, without external influence, the spring 17 acts upon the eccentric 11 so that the eccentric rotates about the axis A so that the eccentric's cams, by way of their contours, press the locking elements 13 radially outward into the toothed ring 10, i.e. the eccentric 11 is acted upon in the direction of rotation situated in the clockwise direction in the drawing. The detent fitting 1 is therefore locked.

If, by contrast, the eccentric 11 is rotated counterclockwise about the axis A by way of the transmission rod, i.e. is acted upon externally, which is schematically illustrated in the drawing by a curved arrow, it contracts the spring 17. A control disk (not specifically illustrated) which sits in a rotationally fixed manner on the eccentric 11 and has slotted guides for the lugs 23 is optionally rotated. The lugs 23 are acted upon inwardly in the radial direction by the spring 17—and optionally by the control disk—as a result of which the locking elements 13 are pulled radially inward. The detent fitting 1 is therefore unlocked, so that the backrest 4 can be pivoted relative to the seat part 5.

The second exemplary embodiment is identical to the first exemplary embodiment if not described differently below, for which reason identical and identically acting components bear reference numbers incremented by 100. In this exemplary embodiment too, the eccentric 111 presses the locking elements 113, which are guided in the guide 115, radially outward without external loading. For this rotation of the eccentric 111 in the clockwise direction, again a single spring 117 is provided which acts on the eccentric 111. The spring 117 is of spiral-shaped design and encircles the axis A. The outer end 117' is in turn fitted to the second fitting part. At the inner end, the spring 117 continues integrally in an inner ring 118 which, on the one hand, reaches by way of projections 117'' in a form-fitting manner into corresponding receptacles of the eccentric 11, and, on the other hand, has two switching contours 118' (e.g., cam surfaces). Each switching contour 118' is arranged radially outside a cam 123 (e.g., a cam follower that is in the form of a projection) which is stamped out of the locking element 113. As in the first exemplary embodiment, upon an externally initiated rotation of the eccentric 111 counterclockwise, the spring 117 is contracted, it respectively pulling the locking elements 113 (by way of the switching contours 118' and the cams 123) radially inward in order to unlock the detent fitting.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A detent fitting for a vehicle seat, the detent fitting comprising:
   a first fitting part;
   a second fitting part mounted for being movable relative to the first fitting part,
   at least one locking element operatively associated with the first and second fitting parts for
      (a) being movable between an inward position and an outward position,
      (b) being guided by the second fitting part while being moved between the inward position and the outward position, and
      (c) interacting with at least the first fitting part, while the locking element is in the outward position, to at least partially lock the detent fitting;
   an eccentric mounted for being rotated at least in a first direction about an axis to thereby act on the locking element and move the locking element from the inward position to the outward position; and at least one spiral-shaped spring that extends around the axis, wherein
the spring is operatively associated with at least the eccentric for rotating the eccentric in the first direction,
the locking element includes a projection,
a portion of the spring is positioned radially outwardly of the projection,
the eccentric is positioned radially inwardly of the locking element,
the inward position is radially inwardly of the outward position,
the eccentric is operatively associated with the spring so that rotation of the eccentric in a second direction causes contraction of the spring,
the second direction is opposite from the first direction, and
the spring is operatively associated with the projection so that the contraction of the spring at least partially pulls the locking element radially inward.

2. The detent fitting according to claim 1, wherein an outer end of the spring is connected to the second fitting part.

3. The detent fitting according to claim 1, wherein the spring is punched, in a spiral-shape, out of a thin spring steel sheet.

4. The detent fitting according claim 1 in combination with the vehicle seat, wherein the vehicle seat includes a backrest and a seat part, and the detent fitting is mounted for at least partially adjusting inclination of the backrest relative to the seat part.

5. The detent fitting according to claim 1, wherein:
the axis extends in an axial direction, and
the projection protrudes in the axial direction.

6. The detent fitting according to claim 1, wherein the portion of the spring engages and extends at least partially around the projection.

7. The detent fitting according to claim 6, wherein the portion of the spring that engages the projection comprises:
a portion of a coil of the spring.

8. The detent fitting according to claim 1, wherein:
the locking element is a first locking element, the inward position is a first inward position, the outward position is a first outward position, and the portion of the spring is a first portion of the spring;
the detent fitting further comprises a second locking element that is diametrically opposite from the first locking element;
the second locking element is operatively associated with the first and second fitting parts for
(a) being movable between a second inward position and a second outward position,
(b) being guided by the second fitting part while being moved between the second inward position and the second outward position, and
(c) interacting with at least the first fitting part, while the second locking element is in the second outward position, to at least partially lock the detent fitting;
the eccentric is further for acting on the second locking element to move the second locking element from the second inward position to the second outward position; and
the second locking element includes a projection that protrudes in the axial direction, and
a second portion of the spring is positioned radially outwardly of the projection of the second locking element.

9. A detent fitting for a vehicle seat, the detent fitting comprising:
a first fitting part,
a second fitting part mounted for being movable relative to the first fitting part,
at least one locking element operatively associated with the first and second fitting parts for
(a) being movable between an inward position and an outward position,
(b) being guided by the second fitting part while being moved between the inward position and the outward position, and
(c) interacting with at least the first fitting part, while the locking element is in the outward position, to at least partially lock the detent fitting;
an eccentric mounted for being rotated at least in a first direction about an axis to thereby act on the locking element and move the locking element from the inward position to the outward position; and
at least one spiral-shaped spring that extends around the axis, wherein
the spring is operatively associated with at least the eccentric for rotating the eccentric in the first direction,
the locking element includes a projection,
a portion of the spring is positioned radially outwardly of the projection,
the portion of the spring engages and extends at least partially around the projection,
the eccentric is operatively associated with the spring so that rotation of the eccentric in a second direction causes the portion of the spring that engages the projection to move in a manner so that the portion of the spring that engages the projection at least partially pulls the locking element radially inward, and
the second direction is opposite from the first direction.

10. The detent fitting according to claim 9, wherein:
the eccentric is positioned radially inwardly of the locking element, and
the inward position is radially inwardly of the outward position.

11. The detent fitting according to claim 9, wherein:
the projection of the locking element is selected from the group consisting of a lug and a cam, and
the portion of the spring, which is positioned radially outwardly of the projection, is selected from the group consisting of
(a) at least one coil of the spring, and
(b) a switching contour of the spring.

12. The detent fitting according to claim 9, wherein an inner portion of the spring is mounted on the eccentric in a form-fitting manner.

13. The detent fitting according to claim 12, wherein the inner portion of the spring comprises an inner ring that is integrally formed with the spring.

14. The detent fitting according to claim 9, wherein the portion of the spring that engages the projection comprises:
a cam surface operative for moving relative to the projection to thereby at least partially pull the locking element radially inward in response to rotation of the eccentric in the second direction.

15. The detent fitting according to claim 9, wherein an inner portion of the spring comprises a ring that is mounted on the eccentric in a form-fitting manner.

16. The detent fitting according to claim 15, wherein:
the inner portion of the spring comprises the portion of the spring that engages the projection,
the portion of the spring that engages the projection comprises a cam surface that is positioned radially outwardly of the projection for engaging and moving relative to the projection to thereby at least partially pull the locking element radially inward in response to rotation of the eccentric in the second direction.

17. A detent fitting for a vehicle seat, the detent fitting comprising:
 a first fitting part;
 a second fitting part mounted for being movable relative to the first fitting part,
 at least one locking element operatively associated with the first and second fitting parts for
  (a) being movable between an inward position and an outward position,
  (b) being guided by the second fitting part while being moved between the inward position and the outward position, and
  (c) interacting with at least the first fitting part, while the locking element is in the outward position, to at least partially lock the detent fitting;
 an eccentric mounted for being rotated at least in a first direction about an axis to thereby act on the locking element and move the locking element from the inward position to the outward position; and
 at least one spiral-shaped spring that extends around the axis, wherein
 the spring is operatively associated with at least the eccentric for rotating the eccentric in the first direction,
 the locking element includes a projection,
 a portion of the spring is positioned radially outwardly of the projection,
 the portion of the spring engages and extends at least partially around the projection,
 the portion of the spring that engages the projection comprises a portion of a coil of the spring,
 the eccentric is operatively associated with the spring so that rotation of the eccentric in a second direction causes contraction of the spring,
 the second direction is opposite from the first direction, and
 the contraction of the spring at least partially pulls the locking element radially inward.

18. A detent fitting for a vehicle seat, the detent fitting comprising:
 a first fitting part;
 a second fitting part mounted for being movable relative to the first fitting part,
 at least one locking element operatively associated with the first and second fitting parts for
  (a) being movable between an inward position and an outward position,
  (b) being guided by the second fitting part while being moved between the inward position and the outward position, and
  (c) interacting with at least the first fitting part, while the locking element is in the outward position, to at least partially lock the detent fitting;
 an eccentric mounted for being rotated at least in a first direction about an axis to thereby act on the locking element and move the locking element from the inward position to the outward position; and
 at least one spiral-shaped spring that extends around the axis, wherein
 the spring is operatively associated with at least the eccentric for rotating the eccentric in the first direction,
 the locking element includes a projection,
 a portion of the spring is positioned radially outwardly of the projection,
 the eccentric is positioned radially inwardly of the locking element,
 the inward position is radially inwardly of the outward position,
 the axis extends in an axial direction,
 the projection protrudes in the axial direction, and
 the portion of the spring engages and extends at least partially around the projection.

19. The detent fitting according to claim 18, wherein the eccentric is operatively associated with the spring so that rotation of the eccentric in a second direction causes contraction of the spring, and the second direction is opposite from the first direction.

20. The detent fitting according to claim 19, wherein the spring is operatively associated with the projection so that the contraction of the spring at least partially pulls the locking element radially inward.

* * * * *